Figure 1:
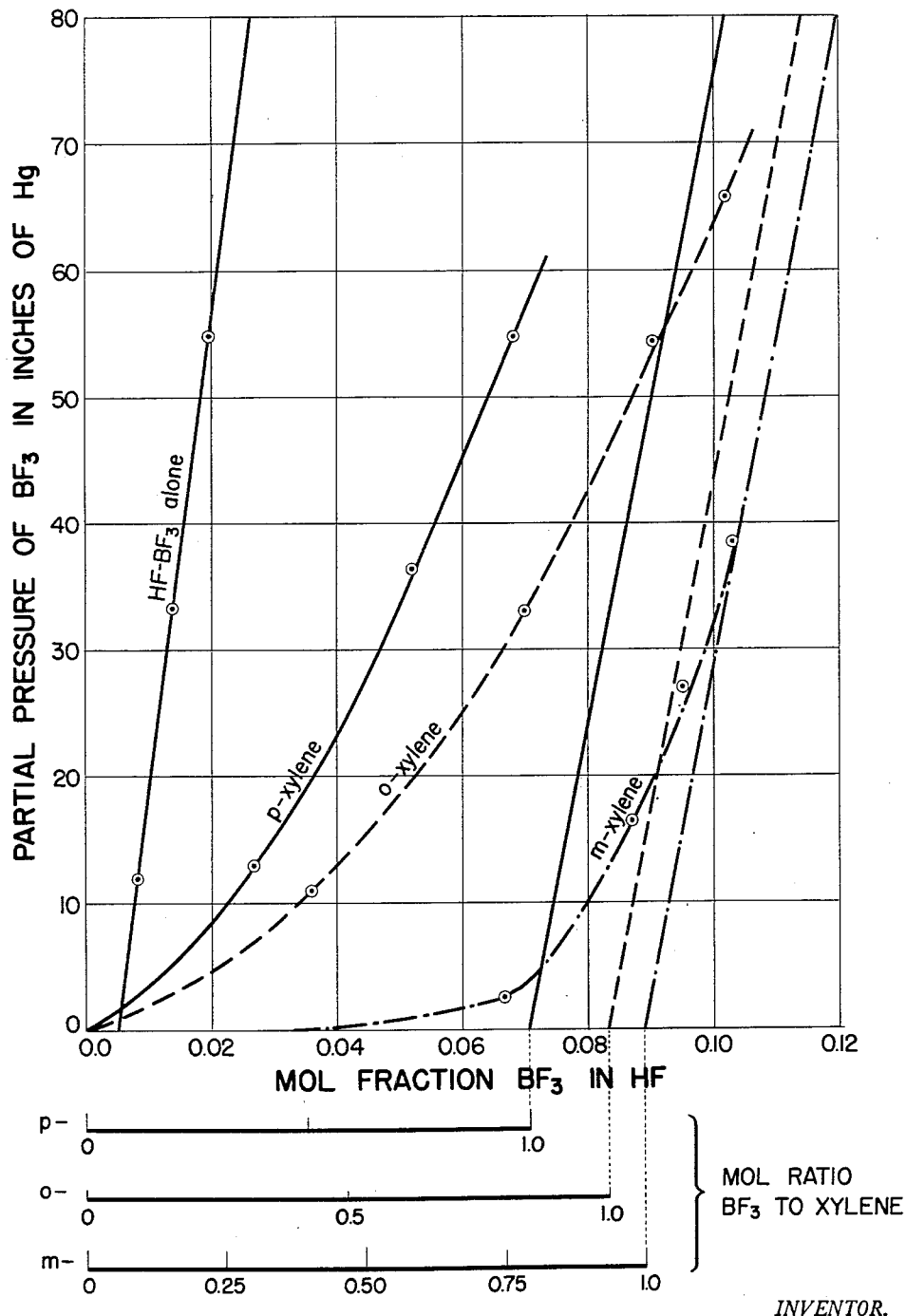

INVENTOR.
Bernard H. Shoemaker
BY
Sam B Becker
Attorney

United States Patent Office 2,727,078
Patented Dec. 13, 1955

2,727,078

XYLENES CONCENTRATION PROCESS

Bernard H. Shoemaker, Hammond, Ind., assignor to Standard Oil Company, Chicago, Ill., a corporation of Indiana Application September 13, 1952, Serial No. 309,400

7 Claims. (Cl. 260—674)

This invention relates to an improved process for the selective separation and recovery of certain dialkylbenzenes from their mixtures with other dialkylbenzenes, which mixtures may also contain monoalkylbenzenes, benzene and saturated hydrocarbons. In a specific and preferred form, this invention relates to a process for the selective separation or concentration and recovery of individual xylene isomers from narrow boiling range aromatic hydrocarbon fractions containing the same. This invention relates more particularly to a process for the selective separation or concentration of meta-xylene from narrow boiling range aromatic hydrocarbon fractions containing meta-xylene and para-xylene, although said aromatic hydrocarbon fractions may also contain ortho-xylene and ethylbenzene.

In the process of the present invention, liquid HF and $BF_3$ are employed as selective reactants and solvents under appropriately selected operating conditions, and by the employment of a novel technique of m-xylene recycle and interaction and countersolvent extraction of o- and p-xylenes from the reaction phase, it is possible to achieve the selective separation of meta-xylene from isomers and less substituted benzene hydrocarbons.

It has been appreciated heretofore that liquid HF and $BF_3$ function jointly as a solvent or "solvent-catalyst" for aromatic hydrocarbons generally, presumably by the formation of complex compounds wherein HF, $BF_3$ and an aromatic hydrocarbon are joined and dissolved in excess HF and $BF_3$ (U. S. Patents 2,343,744, 2,343,841 and 2,405,995, for example). Although it has been postulated prior to my invention that HF—$BF_3$-aromatic hydrocarbon complexes exist, these complexes were not actually isolated or characterized; nor were any comparisons extant of the complex compounds formed by various aromatic hydrocarbons with liquid HF and $BF_3$ or of the equilibrium constants characterizing the chemical reactions which are required to form said complex compounds. Thus, prior to my invention, the molecular composition of HF—$BF_3$-aromatic complexes was not revealed, nor was any publication made of the relative stabilities of the various aromatic complex compounds with liquid HF—$BF_3$.

I have obtained convincing evidence of the actual existence of aromatic hydrocarbon complexes with $BF_3$ and have studied their composition and properties, especially the relative stabilities of various complexes. Surprising variations have been observed in the stabilities of $BF_3$-isomeric xylene complexes which were unexpected because of the close chemical and physical similarities of the xylene isomers. I have also observed that the relative stability of aromatic hydrocarbon complexes containing $BF_3$ can be substantially correlated with the actual extractability of the individual aromatic hydrocarbons by liquid HF and $BF_3$.

Although benzene and toluene have been stated to form complexes with liquid HF and $BF_3$, I have found that such complexes, if they are formed at all, are completely dissociated (i. e., they do not exist as such) at temperatures as low at 0° C.

One object of my invention is to provide a process for the selective separation or concentration of individual xylenes from mixtures of xylenes. Another object of my invention is to provide a process for the selective separation or concentration of meta-xylene from mixtures thereof with para-xylene or ortho-xylene, or from mixtures containing all three isomeric xylenes. An additional object of my invention is to provide a process for the separation or concentration of meta-xylene from aromatic hydrocarbon fractions produced by aromatization of aliphatic or cycloaliphatic hydrocarbons. A further object of my invention is to provide a multistage process for the separation or concentration of meta-xylene from mixtures thereof with other xylenes by chemical reaction and extraction with liquid hydrogen fluoride and $BF_3$, in which process m-xylene or a m-xylene concentrate and a non-polar countersolvent are recycled into intimate contact with the predominantly acidic liquid phase in the chemical reaction-extraction system.

The process of my invention is especially applicable to the treatment of mixtures whose aromatic components consist essentially of about 40 to about 70 volume percent of meta-xylene and a remainder of other $C_8$ aromatics to yield meta-xylene concentrates containing at least about 90 volume percent of meta-xylene. The above and other objects of my invention are achieved by the processes whose details are hereinafter set forth.

CHEMISTRY AND NATURE OF $BF_3$—HF-AROMATIC HYDROCARBON COMPLEXES

Since the process of my invention appears to function through the formation of $BF_3$—HF-aromatic hydrocarbon complexes, consideration in some detail will be given at this point to the identities and properties, especially the relative stabilities of such complexes. In order to prepare and study the complexes in question, a $BF_3$ storage cylinder, a $BF_3$ metering flask and a reaction flask were valved to a manifold of copper tubing which was suitably attached to an evacuation pump. A pressure gage was also attached to the copper manifold line.

A weighed amount of HF and aromatic hydrocarbon (usually about 5 moles of HF and 0.4 mol of alkylbenzene) were introduced into the reaction flask. The flask was then attached to the vacuum system, its contents frozen down with liquid nitrogen, the whole system evacuated and the valve to the vacuum pump closed. Boron trifluoride was then passed into the system from the storage cylinder and allowed to fill the metering flask. The valve of the reaction flask was then opened and increments of $BF_3$ were condensed in the flask. The valve of the metering flask was then closed and the reaction flask allowed to warm to 0° C. in a water-ice bath. The flask was agitated at 5-minute intervals at this temperature until a constant pressure was reached; this usually required from one to two hours. After the pressure reading was taken, the process was repeated, i. e., the contents of the flask were again frozen down in liquid air, another increment of $BF_3$ was added and the pressure was read again when the system came to equilibrium.

The following data were obtained employing the above procedure at 0° C., on the liquid HF—$BF_3$-system (containing no hydrocarbons).

TABLE 1.—$BF_3$-HF SYSTEM

| g. $BF_3$ in liq. phase | g. HF | $BF_3$ Mol Fraction | Partial Press. of $BF_3$ (in. Hg) | Press. HF (in. Hg) |
|---|---|---|---|---|
| 0 | 106 | 0 | 0 | 15 |
| 2.8 | 106 | .0079 | 11.5 | 15 |
| 5.0 | 106 | .0141 | 33 | 15 |
| 7.2 | 106 | .0200 | 54.5 | 15 |

The above data are plotted in Figure 1. It will be noted that when the partial pressure of BF3 is plotted against the mol fraction of BF3 in solution in HF, a straight line results. This straight line intersects the abscissa at about a mol fraction of 0.005, which could be caused by the presence of about 0.25% water in the HF. Neglecting this small deviation it is seen that BF3 in HF obeys Henry's law, which at 0° C. may be expressed as $P_{BF_3} = 3530 N_{BF_3}$ where $P_{BF_3}$ is the partial pressure of BF3 in inches of mercury and $N_{BF_3}$ is the mol fraction of BF3 in solution in liquid HF.

These results show that the solubility of BF3 in liquid HF is relatively low. At one atm. press. and at 0° C. about 3.5 g. of BF3 will dissolve in 100 g. of HF. There is very little tendency for HF and BF3 in a binary system to combine and form the often postulated compound HBF4.

The following data were obtained in a study of the system BF3—HF-meta-xylene at 0° C., employing 44 g. (0.415 mol) of meta-xylene and 93.5 g. (4.675 mols) of liquid HF in the reaction flask.

TABLE 2.—BF3-HF-META-XYLENE SYSTEM

| Mols BF3 in Liq. Phase | Mol Fraction BF3 in HF soln. | Total Press. (in. Hg) | Partial Press. of HF (in. Hg) | Partial Press. of BF3 (in. Hg) |
|---|---|---|---|---|
| 0 | 0 | 14 | 14 | 0 |
| 0.155 | 0.0332 | 16.5 | 13.5 | 3 |
| 0.315 | 0.0674 | 15.5 | 13 | 2.5 |
| 0.404 | 0.0864 | 29.5 | 13 | 16.5 |
| 0.446 | 0.0954 | 39.5 | 12.5 | 27 |
| 0.489 | 0.1024 | 51 | 12.5 | 38.5 |

The partial pressure of BF3 was plotted against the mol fraction of BF3 in the HF as shown in Figure 1. A comparison of the partial pressure of BF3 over the HF—BF3-meta-xylene system with the HF—BF3 system shows that the inclusion of meta-xylene has resulted in a tremendous reduction of the vapor pressure of BF3, clearly indicating the formation of a BF3—HF-meta-xylene complex which has a relatively low vapor pressure compared to HF—BF3. It will be noted that the $P_{BF_3}$ curve approaches an asymptote which is almost parallel to the $P_{BF_3}$ curve of the HF—BF3 system. Extrapolating the asymptote to $P_{BF_3}=0$ indicates the composition of BF3—HF-meta-xylene complex, which can be read off the scale indicating the mol ratio of BF3:meta-xylene. It will thus be seen that the meta-xylene complex contains one mol of BF3 per mol of meta-xylene. This complex of meta-xylene probably also contains one mol of HF and the complex is dissolved by the excess liquid HF which is present in the reaction flask. It appears that the following reaction takes place:

$$BF_3 + HF + \text{m-xylene} \rightleftharpoons BF_3 \cdot \text{m-xylene} \cdot HF$$

The equilibrium constant for this reaction can be defined as follows:

$$Keq = \frac{N \text{ complex}}{P_{BF_3} N_x N_{HF}}$$

where, $N_{complex}$ = mol fraction of the complex in the acid phase;
$N_x$ = mol fraction of free xylene in the acid phase;
$N_{HF}$ = mol fraction of HF;
$P_{BF_3}$ = partial pressure of the BF3 in inches of HG.

From the standpoint of calculating equilibrium constants from the data, a more practical expression of the above equation is $Keq = \text{mols HF} (N_{TBF_3} - N_{BF_3})/P_{BF_3}$ [mols xylene-mols $HF(N_{TBF_3} - N_{BF_3})$] wherein $N_{TBF_3}$ is the total mol fraction of BF3 in the liquid phase, including both free BF3 and BF3 combined in the hydrocarbon complex. $N_{TBF_3}$ can be determined from the $P_{BF_3}$ vs. BF3 mol fraction curve (Figure 1). $N_{BF_3}$ is determined from the Henry's law expression (supra). $N_{HF}$ can be approximated by subtracting $N_{TBF_3}$ from one.

A study of the vapor pressure of the system meta-xylene-BF3—HF over the range of 0° C. to 25° C. showed that the following equation defines the variation in the magnitude of the equilibrium constant with temperature.

$$\text{Log } Keq = \frac{642}{T} - 2.434$$

From this equation it is seen that, for the reaction BF3 (gas) + meta-xylene (1) + HF (1) $\rightleftharpoons$ BF3·m-xylene HF (1), $\Delta H = (2.303 R)(642) = -2.9$ K cal. This value of $\Delta H$ is approximately the same as the heat of condensation of BF3.

The following data were obtained in a study of the system BF3—HF-ortho-xylene at 0° C., employing 44 g. (0.415 mol) of ortho-xylene and 99.5 g. (4.975 mols) of liquid HF.

TABLE 3.—BF3-HF-ORTHO-XYLENE SYSTEM

| Wt. BF3 added (g.) | Mols BF3 in Liq. Phase | Mol Fraction BF3 in Liq. | Total Press. (inches of Hg) | Partial Press. of BF3 (in. Hg) |
|---|---|---|---|---|
| 0 | 0 | 0 | 14 | 0 |
| 12.5 | .178 | .0358 | 24.5 | 11 |
| 25.0 | .346 | .0696 | 46 | 33 |
| 33.3 | .448 | .0901 | 67.5 | 54.5 |
| 37.5 | .506 | .1017 | 78.5 | 66 |

The partial pressure of BF3 was plotted against the mol fraction of BF3 in the HF, as was done in the case of the meta-xylene complex (shown in Figure 1) and a curve was obtained which shows that ortho-xylene likewise formed a complex containing 1 mol of BF3 per mol of ortho-xylene. However, a comparison of the partial pressure of BF3 over the meta-xylene and ortho-xylene complexes shows that the ortho-xylene complex is much less stable than the meta-xylene as evidenced by the far greater $P_{BF_3}$ over the ortho-xylene complex.

The following data were obtained in a study of the system BF3—HF-para-xylene at 0° C. employing 41 g. (0.387 mol) of para-xylene and 109.5 g. (5.475 mols) of liquid HF.

TABLE 4.—BF3-HF-PARA-XYLENE

| Wt. BF3 added (g.) | Mols BF3 in Liq. | Mol Fraction BF3 in Liq. | Total Press. (inches of Hg) | Partial Press. of BF3 (in. Hg) |
|---|---|---|---|---|
| 10.7 | .147 | .0269 | 26.5 | 13 |
| 21.4 | .285 | .0521 | 49.5 | 36.5 |
| 28.5 | .374 | .0680 | 68 | 55 |

A much longer time was required to reach equilibrium with the para-xylene than was necessary with the other xylenes, probably because the para-xylene was a solid at the temperature of measurement.

The results were plotted as before (Figure 1) and a curve was obtained which showed that the para-xylene also formed a complex with HF and BF3 containing one mole of BF3 per mol of para-xylene. However, this complex is less stable even than the ortho-xylene complex.

From the data supplied above, the following approximate equilibrium constants can be calculated:

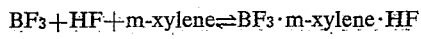

|  | Keq. | Keq. Ratios |
|---|---|---|
| meta-xylene | 0.83 | 20 |
| ortho-xylene | 0.084 | 2 |
| para-xylene | 0.044 | 1 |

The relative stabilities of the meta-, ortho- and para-xylene complexes are in the ratio of their equilibrium constants and are, therefore, 20:2:1.

The following data were obtained employing 43 g. (0.468 mol) of toluene and 86.5 g. (4.325 mols) of liquid HF.

TABLE 5.—BF₃-HF-TOLUENE SYSTEM AT 0° C.

| Wt. BF₃ added (g.) | Mols BF₃ in Liq. | Mol Fraction BF₃ in Liq. | Total Press. (in. Hg) | Partial Press. of BF₃ (in. Hg) |
|---|---|---|---|---|
| 9.9 | .114 | .0264 | 51 | 37 |
| 16.5 | .189 | .0437 | 79 | 65 |

When the mol fraction was plotted against the partial pressure of BF₃ (Figure 2) the points fell on a straight line which passed close to the origin and had a slope almost as steep as the line for HF—BF₃ system. This means that HF, BF₃, and toluene have very little, if any, tendency toward complex formation even under high BF₃ pressures. It follows, therefore, that liquid HF and BF₃ can be used as a solvent for the selective extraction of the xylenes from toluene.

It was expected that all monoalkylbenzenes would behave similarly to toluene; consequently, the results for ethylbenzene were somewhat surprising. They indicated that a stable complex was formed containing only one-half mol of BF₃ per mol of ethylbenzene.

The ethylbenzene employed in the ethylbenzene-HF—BF₃ study was derived by fractionation of technical ethylbenzene in a column packed with wire gauze equivalent to 20 theoretical plates, and a 500 cc. heart cut (7 to 70% on charge) was collected and employed. This fraction had the following properties: $n_D^{20} = 1.4954$, B. P. = 136° C. A portion of this material was used in the vapor pressure measurements.

*Measurement of vapor pressure*

Weight ethylbenzene _____ 44 g. (.415 mols)
Weight HF _____ 114.5 g. (5.725 mols)

TABLE 6

| Wt. BF₃ added (g.) | Total Press. at 0° C. (in. of Hg) | Mols BF₃ in Liq. | Mol Fraction BF₃ in Liq. | Partial Press. of BF₃ (in. of Hg) |
|---|---|---|---|---|
| 9.4 | ¹17.5 | 0.135 | .0236 | 3.5 |
| 18.8 | 44 | 0.252 | .0440 | 30 |
| 25.0 | 74 | 0.318 | .0556 | 60 |

¹ Pressure was 55″ Hg at start. On shaking for 15 minutes at 0° C. it gradually fell to 17.5″ Hg.

Figure 2:
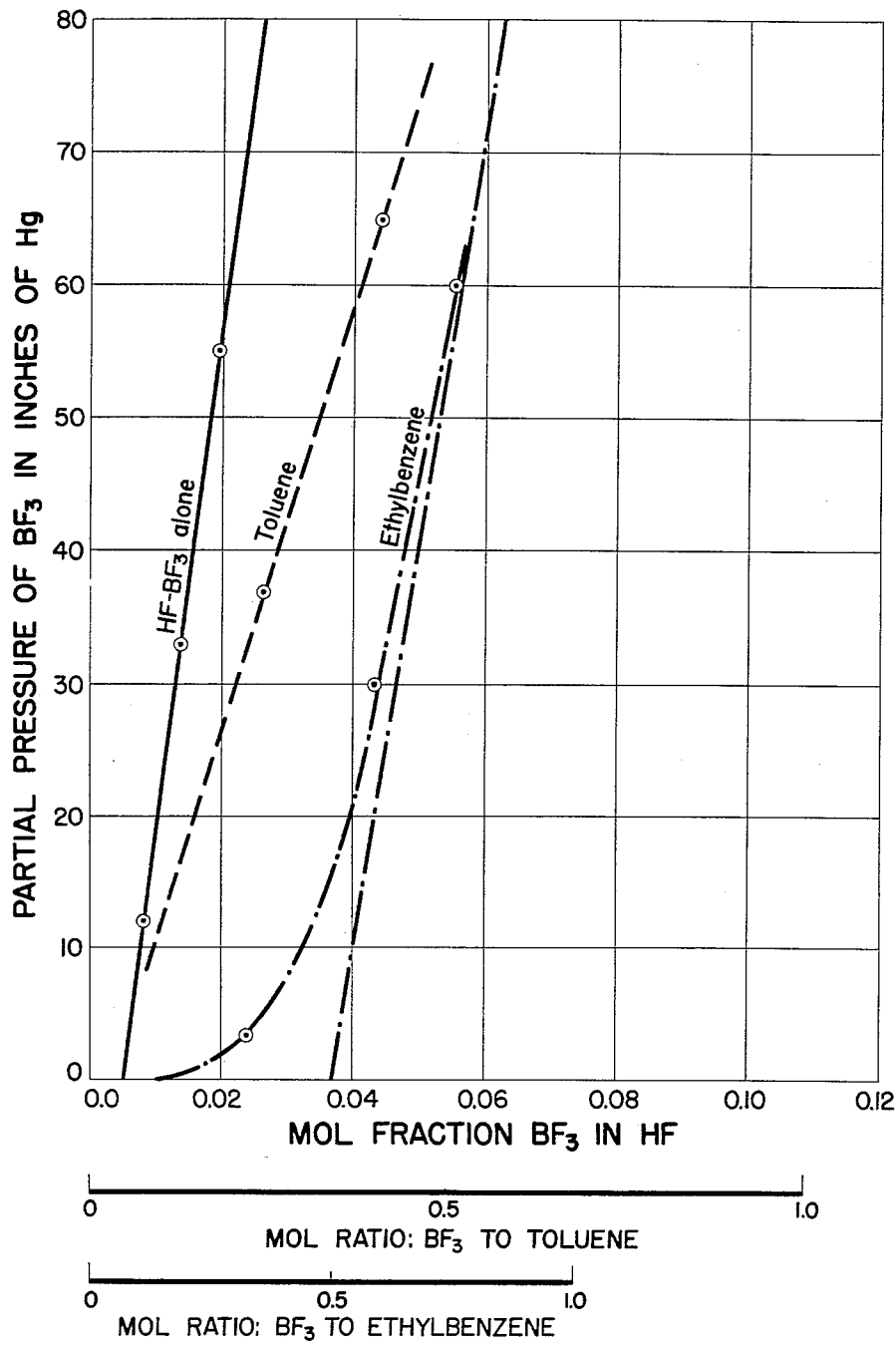

The mol fraction of BF₃ was plotted against its partial pressure (Figure 2). The plot showed that a complex was formed having the same order of stability as the BF₃—HF-meta-xylene complex. However, the plot also showed that only 0.207 mol of BF₃ was required to form the complex, which is exactly ½ the number of mols of ethylbenzene present. This suggests that ethylbenzene disproportionates according to the following equation:

$$2C_2H_5C_6H_5 \rightleftarrows C_6H_6 + C_6H_4(C_2H_5)_2$$

and forms diethylbenzene, which forms a complex with BF₃ and HF, and benzene which does not form a complex with BF₃ and HF at 0° C.

A fractionation analysis of the hydrocarbon product recovered from the experiment showed it to have the following composition:

| | Vol. Percent | Mol Percent |
|---|---|---|
| Benzene | 28 | 40 |
| Ethylbenzene | 5 | 5 |
| Diethylbenzene | 67 | 55 |

Evidently, under the conditions of the experiment, the ethylbenzene disproportionated almost quantitatively into benzene and diethylbenzene, and it was the latter which formed a monomolecular complex with the BF₃ and HF.

An important feature of my invention involves liberating ortho- and para-xylenes from their complexes with liquid HF and BF₃ by the direct introduction and contacting of m-xylene or a m-xylene concentrate with the liquid acid (predominantly HF—BF₃) phase in which the reactions of complex formation to produce the various isomeric xylene-HF—BF₃ complexes are occurring. A practical source of m-xylene for the aforementioned purpose is the end product m-xylene of the present process. Surprisingly, as will be recounted in detail hereinafter, it serves no practical purpose to effect chemical reaction of recycle m-xylene with isomeric xylene-HF—BF₃ complexes to liberate ortho- and para-xylenes therefrom, for the acidic reaction medium containing a substantial proportion of m-xylene-HF—BF₃ complex functions as an excellent solvent for the liberated o- and p-xylenes with the result that increased m-xylene concentration can not be effected merely by m-xylene recycle and reaction as described. If, however, intimate contacting of the acidic liquid reaction phase is effected with a countersolvent for the liberated o- and p-xylenes (and some ethylbenzene), important practical effects are thereby achieved, viz., the Keq for the m-xylene reaction is increased and more m-xylene can therefore be complexed, and the relative concentration of m-xylene in the acidic liquid reaction phase is substantially increased so that by subsequent separation of the components of said acidic phase, a high purity m-xylene can be recovered. Suitable countersolvents (or diluents, as they may be called) must be substantially insoluble in liquid HF and BF₃ and must have the ability to displace and dissolve uncomplexed xylenes from solution in liquid HF—BF₃. Suitable countersolvents comprise low boiling saturated hydrocarbons, i. e. paraffinic and cycloparaffinic hydrocarbons. Specific details are recounted in describing Figure 3 and in the specific examples set forth hereinafter.

The following experiment indicates the results to be obtained in one-stage contacting of a xylenes mixture with HF and BF₃, employing no addition of m-xylene from external sources to the extract phase which is produced.

A batch extraction experiment was carried out in a 1570 cc. carbon steel autoclave fitted with a 1725 R. P. M. mechanical stirrer. A sample of a C-8 cut of hydroformer xylenes was introduced into the reactor along with liquid HF. Next, BF₃ was admitted from a small weighing cylinder and the mixture was stirred for one-half hour at 68-77° F. The initial reactor pressure was 350 p. s. i. g., but when stirring was started the pressure immediately fell to 0 p. s. i. g., showing that the BF₃ was absorbed. At the end of the stirring period the mixture was allowed to settle, and the two phases were separated. The HF and BF₃ were removed from the extract phase by vacuum distillation and the composition of the extract, as well as the composition of the raffinate and the feed were determined by ultra-violet absorption analysis. The results of the experiment are shown in Table 7. The difference in composition between the raffinate and extract shows that meta-xylene was selectively extracted by the HF—BF₃.

TABLE 7.—BATCH EXTRACTION OF HYDROFORMER XYLENES WITH HF—BF₃

*Reactor charge*

Hydroformer xylenes _____ 239 g. (2.25 mols)
BF₃ _____ 93 g. (1.4 mols)
HF _____ 354 g. (17.7 mols)

Results

[Total hydrocarbon recovery=94 wt. percent.]

|  | Wt. (g.) | Wt. Percent | Ultra-violet Absorption Analysis, Wt. Percent | | | | |
|---|---|---|---|---|---|---|---|
|  |  |  | Ortho-Xylene | Meta-Xylene | Para-Xylene | Ethyl-benzene | Total |
| Feed | 239. | 100 | 19.6 | 41.2 | 16.7 | 19.7 | 97.2 |
| Raffinate | 95.3 | 42.5 | 26.1 | 17.7 | 23.3 | 26.1 | 93.2 |
| Extract | 128.6 | 57.5 | 19.4 | 60.7 | 12.5 | 0.1 | 92.7 |

|  | Individual Hydrocarbon Balance, Wt. Percent | | | |
|---|---|---|---|---|
|  | Ortho- | Meta- | Para- | Ethyl-benzene |
| Feed | 19.6 | 41.2 | 16.7 | 19.7 |
| Raffinate plus extract | 22.3 | 43.2 | 17.0 | 11.2 |
| Balance | +2.7 | +2.0 | +0.3 | −8.5 |

*Fractionation analysis of products*

|  | Volume Percent | |
|---|---|---|
|  | Raffinate | Extract |
| Benzene | 2 | 0 |
| C-8 Aromatics | 98 | 83 |
| C-10 Aromatics | 0 | 17 |
|  | 100 | 100 |

From the data presented in Table 7 it will be noted that 57.5% of the feed, which is equivalent to 1.3 mols of xylenes, dissolved in the HF—BF₃ and that 93 g. or 1.4 mols of BF₃ were used, which within experimental error is equal to the mols of xylenes present in the extract phase.

The fact that a mol of BF₃ causes one mol of xylenes to pass into solution in liquid hydrogen fluoride presents a means of treating the extraction of xylenes as a fractional distillation problem, so that engineering calculations of the extraction process can be readily made.

The single stage separation factor α is $$\alpha = \frac{1-N'}{N'} \Big/ \frac{1-N}{N}$$

where $N'$ and $N$ are the mol fractions of meta-xylene in the raffinate and extract respectively. The α corresponds, in vapor-liquid distillation terminology, to the relative volatility. It can be calculated from this single-stage operation factor by the use of a McCabe-Thiele graphical analysis that a system of only four stages is needed to separate hydroformer xylenes into an overhead product comprising 95% ortho- and para-xylenes and a bottoms product containing 95% meta-xylene. The distribution of ortho- and para-xylenes obtained in the present extraction are consistent with α values of 0.69 and 0.47. The α ratios of meta-, ortho- and para-xylenes are, therefore, 15.3:1.47:1, which is considered to be in good agreement with their stability equilibrium ratios of 20:2:1 (supra) as determined by vapor pressure measurements.

The individual hydrocarbon balance in Table 7 shows, within experimental error, that all three xylenes remained unchanged during the run, i. e., they neither isomerized nor disproportionated. However, there is a net disappearance of ethylbenzene and the results of the fractionation analyses of the products shows that the ethylbenzene disproportionated to form benzene plus either diethylbenzenes or ethylxylenes. Ethylbenzene disproportionation can be made substantially complete if the amount of BF₃ is equal at least to 1 mol per mol of xylenes plus 0.5 mol per mol of ethylbenzene. This disproportionation reaction simplifies immensely the xylene separation problem since ethylbenzene is thereby converted to products which boil far from the boiling range of the xylenes. Moreover, the benzene which is produced is substantially insoluble in HF—BF₃ even at temperatures as low as 0° C.

The following experiment illustrates the results attendant upon the addition of meta-xylene to an extract phase having a composition substantially identical with that of the extract phase produced in the immediately preceding experiment.

A homogeneous solution having the following composition was prepared:

Xylenes _____ 179.5 g. (1.58 m.)
    Ortho-xylene _____ 35.8 g.
    Meta-xylene _____ 120.0 g.
    Para-xylene _____ 23.7 g.
Hydrogen fluoride_____ 505 g.
BF₃ _____ 121 g. (1.78 m.)

Total _____ 805.5 g.

To this solution were added 70.0 g. of meta-xylene (slightly more than the ortho- and para-xylene content of the solution) with vigorous agitation. Thereafter the solution was allowed to remain quiescent but no phase separation could be obtained with the exception of a few drops of hydrocarbon material which separated from the acid solution. This experiment clearly shows the great solvent power of an HF—BF₃ solution containing a substantial proportion of meta-xylene-BF₃—HF complex for uncomplexed ortho- and para-xylenes. It will be noted that after the addition of meta-xylene to the solution employed as the starting material, it contained 1.78 mols BF₃ and 2.35 mols xylenes. Therefore, since only 1 mol of BF₃ reacts with 1 mol of an xylene to produce a complex, it will be evident that even if 100% reaction (complex formation) occurred, 0.57 mol xylenes (about a fourth of the total xylene content) must have remained dissolved in the free state in the solution. The hydrogen fluoride and BF₃ were removed from the solution by heating and distillation (with destruction of the xylenes-BF₃—HF complexes), the xylenes were recovered and subjected to ultraviolet spectrum analysis, with the following results:

Weight percent
Ortho-xylene _____ 14.7
Meta-xylene _____ 75.4
Para-xylene _____ 9.9

In other words, no increase in meta-xylene concentration was obtained by meta-xylene recycle to the extract phase in the above operation, within the limits of experimental error, over that which could have been obtained simply by removing hydrogen fluoride and BF₃ from the original solution and adding 70.0 g. of meta-xylene thereto, in which case the expected hydrocarbon analysis would have been:

Weight percent
Ortho-xylene _____ 14.3
Meta-xylene _____ 76.5
Para-xylene _____ 9.5

It is obvious that if BF₃ were added with the meta-xylene to the extract phase, the BF₃-xylenes molar ratio would have been closer to unity and therefore absolutely no opportunity for the separation of a distinct aromatic hydrocarbon liquid phase from the original extract phase, since complex formation could be relied upon to guarantee xylenes solubility rather than physical solution of the xylenes in excess of the BF₃.

The following example is adduced in order to illustrate the effects produced by the claimed process of contacting the extract phase with both meta-xylene and a counter-solvent.

EXAMPLE

The charge to the reactor was substantially identical in amount and analysis with that employed in the immediately preceding experiment, viz:

| | |
|---|---|
| Xylenes | 185 g. (1.75 m.) |
|     Ortho-xylene     37 g., 20% | |
|     Meta-xylene     123 g., 66.5% | |
|     Para-xylene     25 g., 13.5% | |
| Hydrogen fluoride | 500 g. |
| $BF_3$ | 122 g. |
| Total | 807 g. |

The homogeneous solution was stirred for five minutes at 20° C. and then the following hydrocarbon mixture was added thereto:

| | |
|---|---|
| Meta-xylene | 70 g. (0.66 m.) |
| n-Heptane | 206 g. (2.06 m.) |

The mixture was stirred again for fifteen minutes and allowed to settle into an upper hydrocarbon layer (raffinate phase) and a lower acid solution of xylenes (extract phase); the latter was withdrawn into a polyethylene flask containing 800 g. of ice.

The raffinate phase weighed 318 g., $n_D^{20}$ 1.4210 and consisted of 206 g. of n-heptane and 112 g. (1.06 m.) of xylenes. The extracted hydrocarbons (obtained by removing HF and $BF_3$ from the extract phase) weighed 143 g. (1.35 m.); $n_D^{20}$ 1.4972.

Both the raffinate hydrocarbons and extract hydrocarbons were subjected to ultraviolet spectrum analysis with the following results:

| Wt. Percent | Ethyl-benzene | Xylenes | | | Total |
|---|---|---|---|---|---|
| | | Ortho- | Meta- | Para- | |
| Extract | 0±0.9 | 3.8±2.1 | 88.9±0.9 | 3.6±0.5 | 96.3 |
| Raffinate | 0.19±0.35 | 6.33±0.86 | 14.7±0.35 | 5.46±0.2 | 26.7 |

It will be noted that although 70 g. of meta-xylene were added to the HF—$BF_3$-xylenes solution employed as the feed stock, 112 g. of xylenes appeared in the raffinate, of which roughly 17 g. was meta-xylene, leaving about 95 g. of ortho- and p-xylenes. In other words, the selectivity of the overall process for meta-xylene has been substantially increased by contacting the original extract phase with meta-xylene and countersolvent. More specifically, while the α-value of the original extraction process required to produce the extract phase which is treated in accordance with the present invention was about 7, the α-value obtained in the meta-xylene and countersolvent recycle to the extract phase was 9.6 or a gain of more than one-third over the original α-value. At the same time, starting with a feed stock containing about 40 weight percent meta-xylene, the meta-xylene concentration in the product was increased from about 66% to about 90%, without the necessity of investing in practically any new equipment for the process. These results are of enormous economic significance in commercializing HF—$BF_3$-xylenes extraction and were, furthermore, entirely unexpected in the chemical sense.

The proportion of meta-xylene added to the extract phase may vary from about 25 weight percent to about 100 weight percent or even somewhat more, based on the weight of isomeric xylenes contained in said solution, but will more often be between about 50 and about 100 weight percent.

FEED STOCKS

Suitable feed stocks for my concentration process are mixtures of xylenes. The boiling points and freezing points of the xylenes, and of ethylbenzene which boils within the same range, are

| | B. P. (° F.) | F. P. (° F.) |
|---|---|---|
| ortho-xylene | 291.95 | −13.32 |
| meta-xylene | 282.38 | −54.17 |
| para-xylene | 281.03 | +55.87 |
| ethylbenzene | 277.14 | −138.96 |

("Selected Values of Properties of Hydrocarbons"—Nat. Bur. Stds. Circular C461—Nov. 1947—p. 67). From the above boiling point data it will be apparent that a mixture of meta- and para-xylenes cannot be resolved by fractional distillation and this is essentially true also of a mixture of either meta- or para-xylene with ethylbenzene. Although ortho-xylene can be separated by superfractionation from the isomeric xylenes and ethylbenzene, such a process entails high reflux ratios, when the concentration of ortho-xylene in the feed is low, e. g. about 20–30 vol. percent. Also, it is practically impossible to obtain an ortho-xylene concentrate containing more than about 70 vol. percent ortho-xylene by superfractionation from xylene fractions containing saturated hydrocarbons boiling in the same range due to the formation of azeotropes having overlapping boiling ranges between the xylenes and the saturated hydrocarbons. Para-xylene has been separated from mixtures thereof with meta-xylene by fractional freezing, which is an expensive and laborious procedure compared with the process of the present invention. Fractional freezing or melting is severely handicapped, even disregarding economic considerations, by the fact that para- and meta-xylenes form a eutectic mixture containing about 88 weight percent meta- and 12 weight percent para-xylene (M. P. −73° F.) and para-xylene can not therefore be selectively frozen from mixtures containing less than about 16% para-xylene (U. S. Patents 1,940,065 and 2,398,526 and British Patent 585,076).

Aromatic hydrocarbon charging stocks suitable for employment as feed stocks in the process of this invention can be prepared by a variety of processes, probably the most important of which is the catalytic hydroforming process. For the preparation of xylene-rich products, a desirable charge to hydroforming is a light naphthenic naphtha rich in dimethylcyclohexanes (boiling range about 230 to 280° F.). In this process a petroleum naphtha, which may be a virgin or cracked naphtha or mixtures of both, is converted to aromatic hydrocarbons by contact with a solid, porous dehydrogenation catalyst at a temperature in the range of about 850° F. to about 1050° F., preferably in the presence of hydrogen. Suitable catalysts are oxides of metals of groups 2 to 6 of the periodic system, particularly oxides of 6th group metals such as chromium and molybdenum, preferably supported by alumina or magnesia. Excellent catalysts can be prepared by depositing about 4 to about 10% of molybdenum oxide upon an activated alumina. Suitable space velocities for hydroforming fall within the range of about 0.2 to about 4 volumes of the liquid charge per hour per volume of catalyst space. About 0.5 to about 8 mols. of hydrogen can be charged to the process with each mol of naphtha feed stock. (Note also G. Armistead, Jr., Oil & Gas J. 45, 17 (Aug. 31, 1946) pp. 85–7 and 100; L. R. Hill et al., Trans. Am. Inst. Chem. Eng. 42, 4 (Aug. 25, 1946) pp. 611–637.)

Other sources of xylenes and other aromatic hydrocarbon charging stocks for my selective solvent extraction process are catalytic cracking, catalytic dehydrogenation of naphthenes over dehydrogenation catalysts such as $NiS$—$WS_2$ or the like, thermal cracking at high temperatures, preferably in the presence of steam, for example as in the Forward process; the extraction or extractive distillation of virgin naphthas and kerosenes with selective solvents such as phenol, furfural, methanol, ethylene glycol, $SO_2$ and the like; the coking of coal, which yields a light aromatic oil from which it is conventional practice to produce nitration grade xylenes, etc. The above-mentioned processes for the preparation of aromatic hydrocarbons suitable as charging stocks for my selective solvent extraction process are illustrative only.

Suitable xylene mixtures for my selective extraction process have been analyzed by A. D. Streiff and F. D. Rossini. These investigators have reported the results of analysis, by measurements of freezing points of appropriate mixtures, supplemented by analytical distillation, of the four individual C8 alkylbenzenes (ethylbenzene, ortho-xylene, meta-xylene and para-xylene) occurring in the product from the following five different catalytic petroleum refining processes: (1) "Hydroforming," (2) "Two-pass Fixed Bed" catalytic cracking, (3) "Three-pass Fixed Bed" catalytic cracking, (4) "Low-temperature Fluid" catalytic cracking, and (5) "High-temperature Fluid" catalytic cracking. The data indicate that the relative amounts by volume of the four C8 alkylbenzenes are not greatly different in the five different products, being, on the average, as follows: ethylbenzene, 12; ortho-xylene, 21; meta-xylene, 48; para-xylene, 19%. These amounts correspond substantially to those called for in chemical thermodynamic equilibrium for the operating temperatures involved. The naphthenic plus paraffinic hydrocarbon content of the samples varied from about 7 to about 45 percent by volume. ("Alkylbenzenes in the C8 Fraction from Five Different Catalytic Petroleum Refining Processes," J. Res. Nat. Bur. Standards 39 (October 1947), pp. 303–308.)

Xylene charging stocks for my extraction process containing only a low proportion of ethylbenzene (about 5 volume percent or even less) may be produced by catalytically dehydrogenating a xylene-ethylbenzene mixture containing between about 10 and about 25 volume percent of ethylbenzene in one or more operating stages and separating the styrene thus produced by conventional methods, e. g., by conversion to a polymer from which the unconverted xylenes and ethylbenzene can be separated by distillation. Xylenes appear, under some conditions, to promote the dehydrogenation of ethylbenzene (A. A. Balandin and G. M. Marukyan, J. Applied Chem. (U. S. S. R.) 19, 1277–1280 (1946)).

FLOW DIAGRAM

Figure 3:
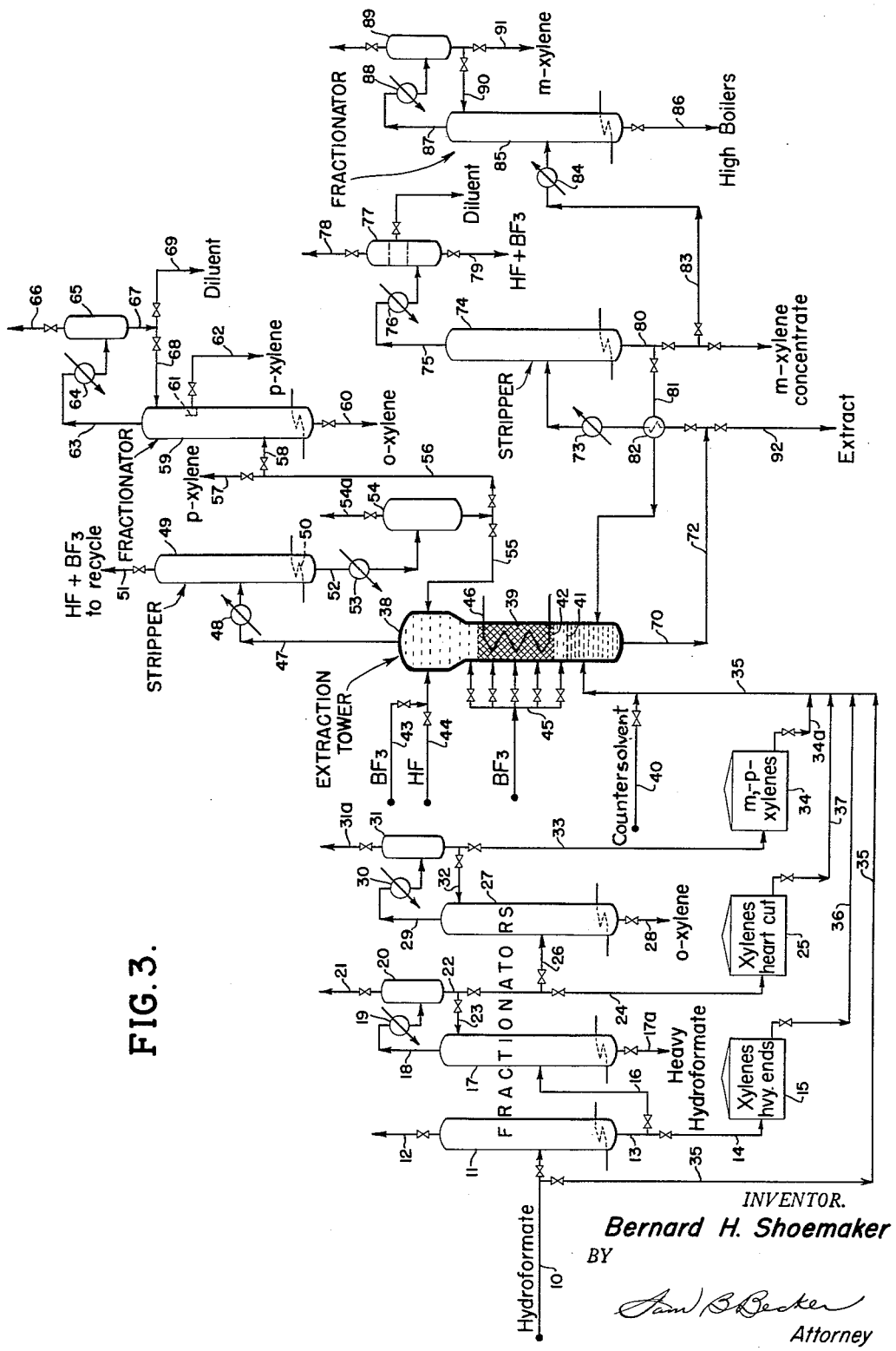

An illustrative flow diagram of the selective concentration process of my invention is presented in Figure 3. The operation of the flow diagram will be described with reference specifically to the separation or concentration of a mixture of isomeric xylenes, although it will readily be understood that the equipment is adaptable for the separation or concentration of other dialkylbenzenes. I may charge, for example, an aromatic fraction obtained by catalytic hydroforming followed by treatment with a solvent such as phenol or the like to extract the aromatic hydrocarbons from associated paraffinic and naphthenic hydrocarbons. The aromatic fraction from hydroforming may include not only the xylenes and ethylbenzene, but also benzene, toluene and some associated saturated hydrocarbons, i. e., paraffinic and cycloparaffinic hydrocarbons boiling in the same range. The boiling range of the total aromatic fraction from hydroforming may be about 170 to about 325° F. The aromatic fraction from hydroforming is passed through valved line 10 into fractionator 11 wherein light ends (boiling range about 170 to 270° F.) are removed overhead through valved line 12. A xylene fraction boiling in the range of about 270 to about 325° F. is removed through line 13 and may be passed through valved line 14 to storage tank 15. Preferably, however, the bottoms from tower 11 are passed through valved line 16 into fractionating tower 17, from which a heavy hydroformate fraction boiling above about 300° F. is discharged through valved line 17a. The overhead from fractionating tower 17 consisting essentially of the isomeric xylenes, ethylbenzene and associated saturated hydrocarbons, boiling in the range of about 270° F. to about 300° F., is passed through line 18 and condenser 19 to reflux accumulator drum 20, provided with a valved vent 21. Tower 17 is refluxed by returning xylenes through valved lines 22 and 23 to its upper portion. The net distillate of tower 17 may be passed through valved line 24 to storage tank 25. If desired, all or a portion of the mixture of isomeric xylenes may be passed through valved line 26 into one or more superfractionating towers 27 wherein an ortho-xylene concentrate is separated as a bottoms cut and discharged through valved line 28. A mixture of meta- and para-xylenes (together with contained ethylbenzene and saturated hydrocarbons) boiling in the range of about 275° F. to about 285° F. is taken overhead through line 29 to condenser 30 and thence to reflux drum 31 equipped with a valved vent 31a. A portion of the condensate is recycled to tower 27 through valved line 32 and the remainder is passed through valved line 33 into a storage tank 34.

The selective extraction process of my invention may be operated upon the total hydroformate fraction, a portion of which may be diverted from line 10 through valved line 35 into the extraction apparatus, or upon the xylene fractions contained in storage tanks 15, 25 or 34, which discharge to the extraction equipment through valved lines 36, 37 and 34a, respectively. The feed stocks should be substantially free of water, since water is tenaciously retained by both HF and BF3. Conventional drying procedures may be used to treat the feed stocks.

Case 1

(Three isomeric xylenes charged.) In this case the xylene charging stock is passed from storage tank 25 through valved line 37 into the extraction zone which in Figure 3 is represented as a tower 38 equipped with suitable packing material 39, which is resistant to the action of mixtures of HF and BF3. Suitable packing materials comprise shaped carbon fragments or Monel metal pieces. A low-boiling countersolvent is introduced into the extraction tower through valved line 40 in amounts between about 0.1 and about 5 volumes (preferably about 0.8 to 1.5 volumes) per volume of charging stock. Part or all of the countersolvent can be introduced (by lines not shown) directly into the extract phase below meniscus 41 in tower 38. Suitable diluents or countersolvents comprise low boiling saturated hydrocarbons such as n- or isobutane, pentanes, hexanes, heptanes, octanes or low boiling cycloparaffinic hydrocarbons such as cyclopentane, methyl- and dimethylcyclopentanes, cyclohexane, methylcyclohexane. Intimate contacting of the countersolvent with the acid phase is desirable. The concentration operation in tower 38 is conducted in such a manner that two immiscible phases are present therein, viz., a lower extract phase whose upper surface is indicated by meniscus 41 and a supernatant raffinate phase 42 above the meniscus 41. The aromatic hydrocarbon charging stock to be extracted is introduced into the lower portion of the extraction tower and BF3 and liquid hydrogen fluoride are introduced into the upper portion of the extraction tower through valved lines 43 and 44, respectively.

Although I prefer to employ essentially anhydrous hydrogen fluoride, i. e. HF containing not more than 1 to 2 weight percent of water, I may employ HF containing up to about 5 to 10 weight percent of water. By HF as used herein, I intend to denote the molecular species having the molecular weight of 20, which molecular weight is applied in the necessary calculations. A manifold 45 is also provided to permit the introduction of BF3 at various levels in the extraction tower. All or a portion of the HF and/or BF3 may also be added to the charging stock at a point or points in advance of the extraction tower 38 and additional HF and/or BF3 can then be added as described above.

In the extraction tower the xylene charging stock is contacted with a counterflow of a molar excess of liquid hydrogen fluoride (usually between about 5 mols and about 50 mols or even more per mol of xylenes contained in said charging stock) and $BF_3$ (an amount between about 0.2 and about 0.8 mol of xylene containing in said charging stock) at a temperature between about 0 and about 150° F. under pressure sufficient at least to maintain the liquid phase, for a period of time sufficient to effect selective chemical reaction and extraction, usually between about 1 and about 30 minutes. My preferred operations involve the use of 7 to 15 mols of hydrogen fluoride per mol of xylenes, about 0.4 to 0.7 mol of $BF_3$ per mol of xylenes, a temperature between about 60 and about 100° F. and a contacting period varying in length between about 5 and 15 minutes. Since the extraction of xylenes by liquid HF and $BF_3$ is accompanied by considerable evolution of heat, as has been pointed out above, it is desirable to provide cooling coils, diagrammatically represented at 46, in order to prevent undue temperature rises in the extraction tower. If desired, the cooling may be so conducted as to provide an ascending temperature gradient, for example, of about 10° F. to 25° F. or even 50° F. across the length of the extraction zone.

The raffinate is taken overhead from extraction tower 38 through valved line 47 and heater 48 into stripping tower 49 provided with a heating coil 50 in the lower portion thereof. In tower 49, HF and $BF_3$ are stripped from the raffinate and passed overhead through valved line 51 whence all or a portion may be recycled to extraction tower 38. The low boiling diluent or countersolvent, such as pentane, may pass overhead from tower 49 with HF and $BF_3$ and is separated therefrom by condensation followed by separation of two immiscible liquid layers, and is recycled to the process. Tower 49 may suitably be operated with a top temperature between about 150° F. and about 250° F., a bottom temperature between about 250° F. and about 400° F. and pressures between about 0 and about 100 p. s. i. g. The stripped raffinate is removed from tower 49 through valved line 52 and cooler 53 and thence to accumulator 54 provided with a valved vent line 54a. It is usually desirable to recycle a portion (for example between about 5 and about 50 percent by volume) of the raffinate through valved line 55 into an intermediate portion of the extraction zone; the remainder is passed through valved line 56 whence a raffinate substantially depleted in meta-xylene content may be removed from the system through valved line 57.

If desired, all or a portion of the net raffinate in line 56 may be passed through valved line 58 to fractionating tower 59 to remove ortho-xylene as a bottoms fraction through valved line 60; a fraction rich in para-xylene and containing either no meta-xylene or a substantially reduced meta-xylene content as compared with the charging stock is trapped out on tray 61 of the fractionating tower, whence it is removed through valved line 62. The para-xylene concentrate in line 62 may contain some ethylbenzene which escaped disproportionation in tower 38. The ethylbenzene can be separated from the para-xylene by treatment with liquid hydrogen fluoride and with $BF_3$ in the amount of at least 1 mol per mol of xylene plus 0.5 mol per mol of ethylbenzene at temperatures between about 0° F. and about 150° F., preferably about 30° F. to about 80° F., under pressure sufficient at least to maintain the liquid phase. Ethylbenzene is thereby disproportionated into benzene, diethylbenzenes and ethylxylenes, which can readily be separated by fractional distillation from the xylene.

Either or both the ortho- or para-xylene concentrates obtained from fractionating tower 59 may be subjected to such further purification treatments as may be desirable. Thus, the para-xylene fraction may be further purified by fractional freezing. The ortho-xylene concentrate may be further purified by re-extraction with liquid HF and $BF_3$ or by fractional distillation or by both operations in that sequence. It may sometimes be desirable to remove a very small proportion of fluorides contained in the ortho- or para-xylene concentrates derived from the raffinate of the present extraction process. The defluorination may be effected by conventional methods known in the art of treating hydrocarbons with hydrogen fluoride and/or $BF_3$, for example, by washing with water or alkaline solutions; treating the hydrocarbons with metal fluorides such as sodium, potassium, ammonium, and calcium fluorides; treating the hydrocarbons in vapor phase with clays or dehydrogenation catalysts such as chromium oxide supported on alumina or with bauxite; and the like.

The low-boiling saturated hydrocarbon countersolvent employed in the extraction process may be separated from associated xylenes by distillation overhead from tower 59 through line 63 into condenser 64 and thence into reflux drum 65 provided with valved vent line 66. A portion of the hydrocarbon countersolvent or diluent is recycled from drum 65 through line 67 and valved line 68 to tower 59 and the remainder is removed through valved line 69 to storage or recycle to the extraction zone.

The extract phase, which is a solution of $BF_3$—HF-xylene complexes in liquid HF is withdrawn from extraction tower 38 through line 70. Ordinarily, the extract phase is passed from line 70 through valved line 72 and heater 73 into stripping tower 74. Since saturated hydrocarbon countersolvents or diluents are virtually insoluble in liquid HF—$BF_3$ under the conditions employed in my process, only very small amounts of said diluents may be taken overhead through line 75 and condenser 76 to accumulator drum 77, along with HF and $BF_3$. Some $BF_3$ may be vented through valved line 78 for recycle to the extraction zone and the remainder, with the HF, is removed from drum 77 through valved line 79 for reuse in the extraction process, after purification, if desired.

When the aromatic components of the charging stock to the extraction process consist essentially of a mixture of xylenes, the bottoms derived from tower 74 will consist essentially of meta-xylene or a meta-xylene concentrate having a substantially higher concentration of meta-xylene than that of the aromatic constituents of the charging stock to the extraction process. The meta-xylene or meta-xylene concentrate thus produced is withdrawn from tower 74 through valved line 80 and may be subjected to such aftertreatment as desired, for example, defluorination as described above for the purification of ortho- and para-xylenes. When meta-xylene of very high purity is desired it is usually desirable to divert the meta-xylene concentrate from line 80 through valved line 83 and heater 84 into fractionating tower 85, whence high boiling impurities such as diethylbenzenes and ethylxylenes in the meta-xylene concentrate are withdrawn through valved line 86, and meta-xylene is taken overhead through line 87 and condenser 88 into reflux drum 89. A portion of the purified meta-xylene is recycled to tower 85 through valved line 90 and the remainder is removed as product through valved line 91. A portion of the purified m-xylene product is desirable recycled to contact with the lower acid phase in tower 38.

Instead of stripping all the $BF_3$ from the extract phase, only a part of the $BF_3$ may be stripped off, e. g., by careful heating at subatmospheric pressures, to produce two phases, viz. an upper (second) raffinate phase and a lower (second) extract phase. The upper phase may be recycled to extraction tower 38 and the lower phase may be further treated to remove $BF_3$ contained therein, yielding a meta-xylene concentrate having a higher meta-xylene content than is ordinarily obtained by one-stage stripping of the entire $BF_3$ content of the extract phase withdrawn from tower 38 through line 70.

At least a portion of the meta-xylene or meta-xylene concentrate is recycled to the chemical reaction-extraction process to operate by passing at least a portion of the meta-xylene through valved line 81 and cooler 82 for introduction below meniscus 41 and intimate contacting in the lower portion of extraction tower 38. The recycled meta-xylene exerts chemical displacement effects on the extract phase, selectively displacing ortho- and para-xylene from their complexes with $BF_3$ and HF, resulting, following intimate contacting of said extract phase with a non-polar countersolvent, in the rejection of ortho- and para-xylene to the raffinate phase in tower 38. A portion of the meta-xylene concentrate may be subjected to further selective extraction with liquid HF—$BF_3$ in a second extraction tower.

It should be understood that the extract phase containing HF and $BF_3$ represents a useful composition per se. Since the extract phase is a concentrate of $BF_3$—HF-meta-xylene complex dissolved in excess HF and $BF_3$, it is a highly reactive composition. Thus, the extract phase may, without removal of HF and $BF_3$, be subjected to various chemical conversion operations affecting the meta-xylene and other aromatic hydrocarbons contained therein. For example, the extract phase may be treated with olefins, alcohols or alkyl halides under suitable conditions of temperature and pressure to effect alkylation of meta-xylene, the HF and $BF_3$ in the extract phase functioning as the catalyst. Also, the extract phase may be subjected to temperatures within the range of about 160° F. to about 600° F. under pressure sufficient to maintain the liquid phase for about 2 minutes to about 4 hours, to produce isomeric xylenes and xylene disproportionation products such as mesitylene, benzene and toluene, the latter two of which are substantially insoluble in the extract phase and can be separated therefrom as a distinct supernatant layer. For these and similar purposes the extract phase may be withdrawn through valved line 92.

*Case 2*

(Meta- and para-xylene charging stock.) The above charging stock is withdrawn from storage tank 34 and passed by valved line 34a into extraction tower 38. Since ortho-xylene is fractionated from the feed stock in tower 27 there will be no need to remove ortho-xylene from the raffinate by fractionation in tower 59 as was required in Case 1 wherein the charging stock contained ortho-xylene. In the present case the raffinate would consist essentially of para-xylene or a para-xylene concentrate and such diluent as was added to the extractor through valved line 40. Therefore, the extraction system would be operated as in Case 1, employing tower 59 to remove countersolvent or diluent overhead, but removing a bottoms fraction of para-xylene or a concentrate thereof through line 60.

*Case 3*

(Benzene, toluene and $C_8$ aromatic hydrocarbon charging stock.) When the hydrocarbon feed stock to the extraction process includes benzene and toluene in addition to the $C_8$ aromatic hydrocarbons, the benzene and toluene are not extracted by the liquid HF—$BF_3$, since they form no complexes with $BF_3$. The charging stock is fed through valved line 35 to extraction tower 38, whence raffinate passes overhead. Further process steps differ from those previously set forth under Case 1 in that steps are taken to fractionate the benzene and toluene contained in the raffinate from the raffinate xylenes. In fractionating tower 59, the operating conditions are adjusted to distil benzene and toluene overhead through line 63 into condenser 64 and thence to reflux drum 65, from which a portion is returned to fractionating tower 59 through valved line 68 and net benzene and toluene distillate is removed from the system through valved line 69. This distillate fraction is valuable for blending in high performance aviation gasolines or for chemical conversion operations. A side cut of para-xylene is trapped out through line 62 and ortho-xylene is removed as bottoms through valved line 60. Alternatively, ortho- and para-xylenes are removed together as bottoms through line 60 whence they may be passed to another fractionating tower (not shown) in order to remove para-xylene as the distillate and to remove ortho-xylene as a bottoms fraction. In another method of operation, the charging stock containing benzene, toluene, and $C_8$ aromatic hydrocarbons can be prefractionated to remove an ortho-xylene cut as bottoms, and a distillate consisting essentially of benzene, toluene, meta- and para-xylenes and ethylbenzene can be passed through extraction tower 38.

Although Figure 3 describes a continuous extraction operation, the process of my invention, as the above example clearly shows, can be operated batchwise. It can also be operated in a plurality of stages employing either batch or continuous extraction equipment. Various contacting equipment may be used in lieu of the packed tower shown in Figure 3, for example, agitated autoclaves or the like in combination with settling drums, or a pipe coil wherein the HF, $BF_3$ and charging stock are concurrently contacted at high velocity and discharged into a settling chamber. Instead of settling drums, centrifuges may be used. The above and other known means of contacting employed in solvent extraction processes and in processes wherein liquid catalysts are contacted with hydrocarbons may be employed to practice the process of my invention.

In one-stage batch operation, I prefer to add an amount of $BF_3$ just sufficient to cause the formation of two liquid phases, in order to produce a meta-xylene concentrate having the highest proportion of meta-xylene. This amount of $BF_3$ will be not more than 1 mol per mol of meta-xylene contained in the feed stock.

Although HF and especially $BF_3$ are relatively expensive reagents and would of necessity be recovered in any large commercial application of the process of this invention, in small scale operations the recovery of these reagents might be considered immaterial. When the recovery of HF and $BF_3$ as such is not required, the distillation and stripping operations illustrated in Figure 3 may be dispensed with. As an alternative to distillation of the extract phase, said phase may be mixed with water, alkaline solutions or the like which dissolve the HF and $BF_3$, leaving a supernatant hydrocarbon phase which may then be recovered. An alternative would be to distil free HF and $BF_3$ from the extract phase, following which the residual firmly bound $BF_3$—HF-xylene complex is treated with water or aqueous alkaline or acid solutions to liberate xylenes bound in said complex. In place of the aqueous solutions mentioned above, one may employ organic compounds capable of forming complexes with HF and $BF_3$ and which are capable of displacing xylenes, especially meta-xylene from its complexes with HF—$BF_3$, e. g., organic compounds having a more basic (electron-donating character) than the xylenes, especially meta-xylene. Such organic compounds include various amines, sulfur compounds, e. g., alkyl (bis)thioethers, and oxygenated organic compounds such as phenol, alkyl ethers, ketones, aldehydes, etc.

A great many chemical reactions, uses and possible applications of the isomeric xylenes have been studied more or less extensively ("Xylene Technical Review;" published by Oronite Chemical Co., 1947). At the present time it appears that the largest scale demand for ortho-xylene is for its employment as a charging stock for vapor phase catalytic oxidation processes for the production of phthalic anhydride (I. E. Levine, Trans. Am. Inst. Chem. Eng. (Chem. Eng. Progress) 43, 4 (April 1947, pp. 168–171)).

Meta-xylene is a valuable high octane aviation gasoline component. It is a useful chemical raw material for the preparation of 3,5-dimethylethylbenzene, meta-xylene sulfonic acid, the preparation of dyes, iso-phthalic acid, pharmaceuticals, etc.

Para-xylene is desirable as a high octane aviation gasoline component. Another outlet of potentially greater commercial significance for para-xylene lies in its oxidation to terephthalic acid which reacts with ethylene glycol to produce synthetic resins which can be used for the production of synthetic textile fibers.

The present application is a continuation-in-part of my application for United States Letters Patent, Serial No. 46,123, filed on August 25, 1948, now abandoned.

Having thus described my invention, what I claim is:

1. In a process for the selective separation of meta-xylene from a hydrocarbon stock whose aromatic components comprise essentially meta-xylene and at least one isomeric xylene, which process comprises the step of forming a solution comprising complexes of meta-xylene and at least one isomeric xylene with liquid hydrogen fluoride and $BF_3$, the improvement which comprises introducing into said solution a meta-xylene stream without any substantial accompaniment of $BF_3$, simultaneously introducing into said solution a countersolvent, thereby selectively liberating said isomeric xylene from its complex with hydrogen fluoride and $BF_3$ and effecting the displacement of the isomeric xylene thus liberated into a liquid phase which is insoluble in said solution, and separating the distinct liquid phases thus produced.

2. The process of claim 1 wherein said countersolvent is a low-boiling saturated hydrocarbon and it is employed in a proportion between about 0.1 and about 5 volumes per volume of said solution.

3. In a process for the selective separation of meta-xylene from a hydrocarbon stock whose aromatic components comprise essentially meta-xylene and at least one isomeric xylene, which process comprises the step of forming a solution comprising complexes of meta-xylene and at least one isomeric xylene with liquid hydrogen fluoride and $BF_3$, the improvement which comprises introducing into said solution a meta-xylene stream without any substantial accompaniment of $BF_3$, the proportion of meta-xylene thus introduced into said solution being between about 25 and about 100 percent by weight of said isomeric xylene present in said solution, simultaneously introducing into said solution a low-boiling saturated hydrocarbon countersolvent in proportion between about 0.1 and about 5 volumes per volume of said solution, thereby selectively liberating said isomeric xylene from its complex with hydrogen fluoride and $BF_3$ and effecting the displacement of said isomeric xylene thus liberated into a liquid phase which is insoluble in said solution, and separating the distinct liquid phases thus produced.

4. In a process for the selective separation of meta-xylene from a hydrocarbon stock whose aromatic components comprise essentially meta-xylene and at least one isomeric xylene, which process comprises the step of forming a solution comprising complexes of meta-xylene and at least one isomeric xylene with liquid hydrogen fluoride and $BF_3$, the improvement which comprises introducing into said solution a meta-xylene stream without any substantial accompaniment of $BF_3$, the proportion of meta-xylene thus introduced into said solution being between about 50 and about 100 percent by weight of said isomeric xylene present in said solution, simultaneously introducing into said solution a low-boiling saturated hydrocarbon countersolvent in proportion between about 0.8 and about 1.5 volumes per volume of said solution, thereby selectively liberating said isomeric xylene from its complex with hydrogen fluoride and $BF_3$ and effecting the displacement of said isomeric xylene thus liberated into a liquid phase which is insoluble in said solution, and separating the distinct liquid phases thus produced.

5. In a process for the selective separation of meta-xylene from a hydrocarbon stock whose aromatic components comprise essentially meta-xylene and at least one isomeric xylene, which process comprises the step of forming a solution comprising complexes of meta-xylene and at least one isomeric xylene with liquid hydrogen fluoride and $BF_3$, the improvement which comprises introducing into said solution a meta-xylene stream without any substantial accompaniment of $BF_3$, the proportion of meta-xylene thus introduced into said solution being between about 50 percent and about 100 percent by weight of said isomeric xylene present in said solution, simultaneously introducing into said solution a low-boiling saturated hydrocarbon countersolvent in a proportion between about 0.1 and about 5 volumes per volume of said solution, thereby selectively liberating said isomeric xylene from its complex with hydrogen fluoride and $BF_3$ and effecting the displacement of a greater quantity of liberated xylenes than the quantity added in said meta-xylene stream into a liquid phase which is insoluble in said solution, and separating the distinct liquid phases thus formed.

6. The process of claim 5 wherein the proportion of said countersolvent is between about 0.8 and about 1.5 volumes per volume of said solution.

7. In a process for the selective separation of meta-xylene from a hydrocarbon stock whose aromatic components comprise essentially meta-xylene and at least one isomeric xylene, which process comprises the step of forming a solution of complexes of xylenes with liquid hydrogen fluoride and $BF_3$ whose hydrocarbon components comprise about 65 weight percent of meta-xylene the improvement which comprises introducing into said solution a meta-xylene stream without any substantial accompaniment of $BF_3$, the proportion of meta-xylene thus introduced into said solution being about 100 percent by weight of said isomeric xylene, simultaneously introducing a low-boiling saturated hydrocarbon countersolvent into said solution, thereby selectively liberating said isomeric xylene from its complex with hydrogen fluoride and $BF_3$ and effecting the displacement of a greater quantity of liberated xylenes than the quantity added in said meta-xylene stream into a liquid phase which is insoluble in said solution, separating a predominantly acid liquid phase and a predominantly hydrocarbon liquid phase, the meta-xylene concentration of which is about 90 percent relative to isomeric xylenes.

References Cited in the file of this patent

UNITED STATES PATENTS

| | | |
|---|---|---|
| 2,401,852 | Arnold et al. | June 11, 1946 |
| 2,481,843 | Holt et al. | Sept. 13, 1949 |
| 2,521,444 | Brooke et al. | Sept. 5, 1950 |